(12) United States Patent
Heaviside

(10) Patent No.: US 6,422,630 B1
(45) Date of Patent: Jul. 23, 2002

(54) TRUCK BED EXTENSION

(76) Inventor: Patrick G. Heaviside, 1715 Bowers Ave., Santa Clara, CA (US) 95051

( * ) Notice: Subject to any disclaimer, the term of this patent is extended or adjusted under 35 U.S.C. 154(b) by 0 days.

(21) Appl. No.: 09/277,412

(22) Filed: Mar. 26, 1999

(51) Int. Cl.[7] ............................................. B62D 33/03
(52) U.S. Cl. ................... 296/57.1; 296/26.11
(58) Field of Search ............................ 296/26.08, 26.11, 296/50, 57.1, 26.1, 26.09

(56) References Cited

U.S. PATENT DOCUMENTS

| 4,472,639 | A | * | 9/1984 | Bianchi | 296/26.11 |
|---|---|---|---|---|---|
| 4,531,773 | A | * | 7/1985 | Smith | 296/26.11 |
| 5,468,038 | A | * | 11/1995 | Sauri | 296/57.1 |
| 5,478,130 | A | * | 12/1995 | Matulin et al. | 296/57.1 |
| 5,522,685 | A | * | 6/1996 | Lessard | 296/26.09 X |
| 5,669,654 | A | | 9/1997 | Eilers et al. | 296/26 |
| 5,741,039 | A | * | 4/1998 | Habdas | 296/57.1 |
| 5,775,759 | A | * | 7/1998 | Cummins | 296/26.11 |
| 5,806,907 | A | * | 9/1998 | Martinus et al. | 296/26.11 |
| 5,857,724 | A | * | 1/1999 | Jarman | 296/26.11 |
| 5,868,449 | A | * | 2/1999 | Hitchcock | 296/57.1 |
| 5,902,000 | A | * | 5/1999 | Wold | 296/26.11 |
| 5,918,925 | A | * | 7/1999 | Perrin | 296/26.11 |
| 5,924,753 | A | * | 7/1999 | DiBassie | 296/26.09 |

* cited by examiner

Primary Examiner—Stephen T. Gordon
Assistant Examiner—Jason Morrow
(74) Attorney, Agent, or Firm—Robert S. Smith

(57) ABSTRACT

A door mounted on the edge of a tailgate of a pickup truck that is foldable against the inside surface of the tail gate when the tail gate is vertical or horizontal or is oriented away from the tailgate when the tailgate is horizontal thereby enclosing the bed of the truck when the tailgate is horizontal. The door effectively converts the truck bed from the standard six foot length to the standard eight foot length such as for carrying stack of eight foot panels, without having to tie down the panels, or for carrying loose piles of material. The door panel is detachable when required.

6 Claims, 5 Drawing Sheets

TRUCK BED EXTENSION

FIELD OF THE INVENTION

This invention is directed toward beds for pickup trucks and particularly toward a rear door attachable to the existing tailgate that converts a six foot bed into an eight foot bed.

PRIOR ART AND INFORMATION DISCLOSURE

Pickup trucks have become very popular even as a second vehicle for an owner that does not depend on its use as a part of his business. For this type of owner, a pickup truck having a six foot bed is very attractive in terms of cost, convenience in city driving and for meeting most of his "light weight duties". It usually happens with these owners that they must carry items that are longer than six feet such as wall panels or plywood sheets that are eight feet long. On these occasions, the owner must "make do" by lowering the truck tailgate to a horizontal position, leaving the tail end of the bed open. He must then take extra precautions to tie down his cargo including the panels and any other items that his truck is transporting since, in the worst scenario, his cargo may fall out of the back of the truck and in a lesser happening he is subject to being stopped by the police for violating. ordinances against such practice of carrying cargo unsafely.

Manufacturers have attempted to increase cargo capacity in utility vehicles by incorporating sliding platforms or rack. The platforms may be mounted within the truck bed and include a table with rollers to facilitate selective extension of the platform. Such additions have resulted in reduction of cargo space in terms of the rails and rollers that are folded into the truck when not in use.

U.S. Pat. No. 5,669,654 to Eilers discloses a selectively extendable tailgate section including a sidewall and floor section that telescopes into the fixed sides and floor of the cargo bed. The addition of this invention is expensive and an overkill solution to meet a requirement to simply convert a six foot bed to an eight foot bed to facilitate carrying a load such as eight foot panels on a bed that was originally a six foot bed.

SUMMARY OF THE INVENTION

It is an object of this invention to extend the useable length of a pickup truck having a six foot bed to an eight foot bed. It is a further object that extension of the bed may be conveniently accomplished on existing pickup trucks with limited expense. It is another object that, when the extension is not required, that that the extension occupy limited space and not present an unattractive appearance.

This invention is directed toward a door or panel that has the approximate height and width of the tailgate and is hingably attached to a pair of angles, each one angle fastened to a side edge of the tailgate opposite the other angle fastened to the other side edge of the tailgate such that the added door has an edge that swings on an axis along the top edge of the existing tailgate. When the existing tailgate is rotated so that it is an extension of the truck bed supported by a chain or brace as is typical with pickup trucks, then the added door rotates into a vertical position and retained by a pair of unfolded braces, each brace having one end secured to the door and the other end secured to the angle.

DESCRIPTION OF PREFERRED EMBODIMENTS

Figure 1:
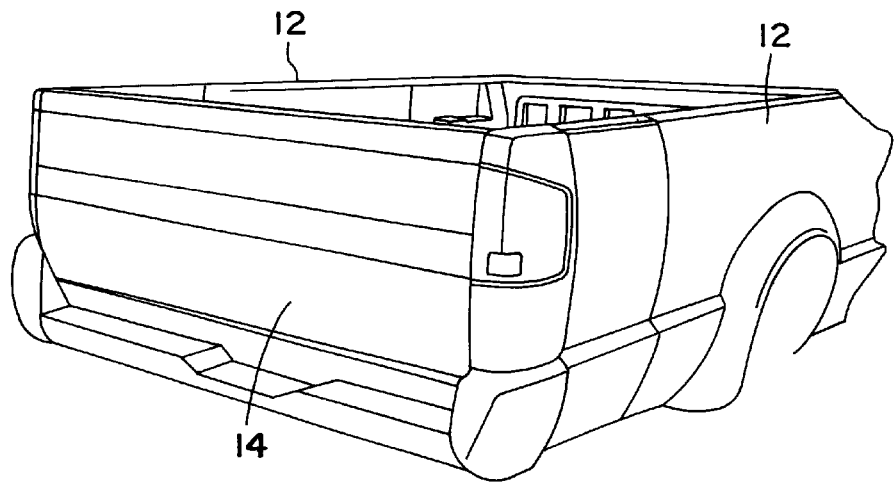
FIG. 1 shows shows a truckbed of the prior art with the tailgate up.
Figure 2:
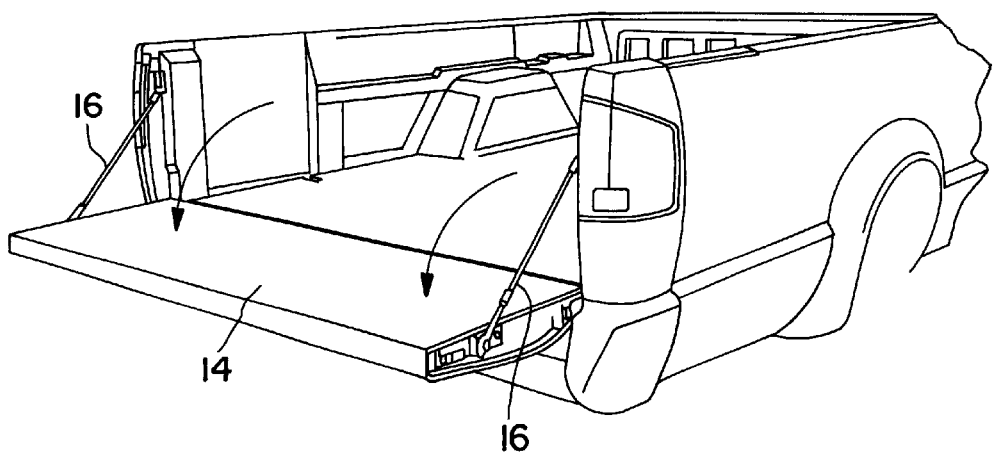
FIG. 2 shows shows a truckbed of the prior art with the tailgate down.

Turning now to a discussion of the drawings, FIG. 1 shows the bed of a typical pickup truck including side walls 12 and a tailgate 14 in the closed position according to the prior art. FIG. 2 shows the same truck body with the tailgate 14 in the open position. The tailgate is supported in the open position by a pair of stabilizers 16.

Figure 3:
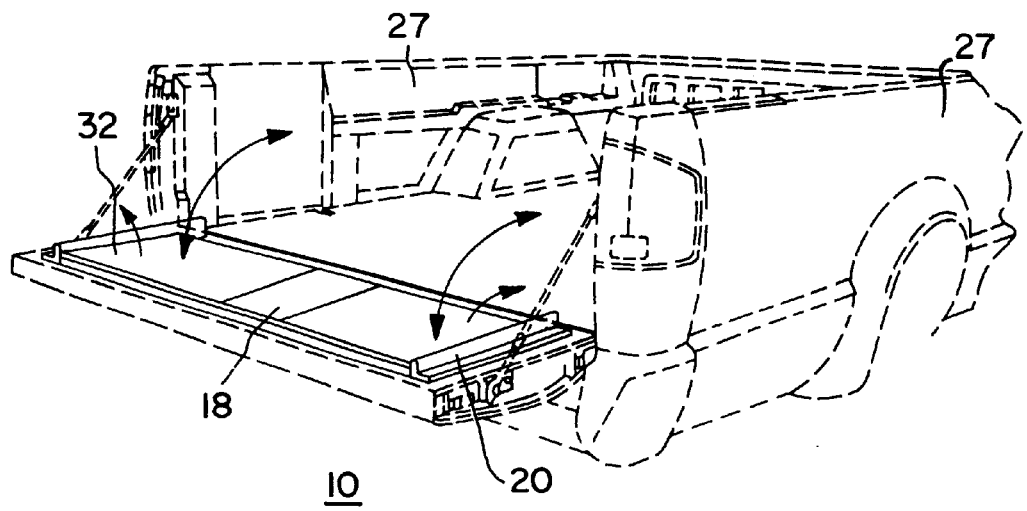
FIG. 3 shows shows a truckbed of the prior art with the tailgate down and the door of this invention folded against the tailgate.
Figure 4:
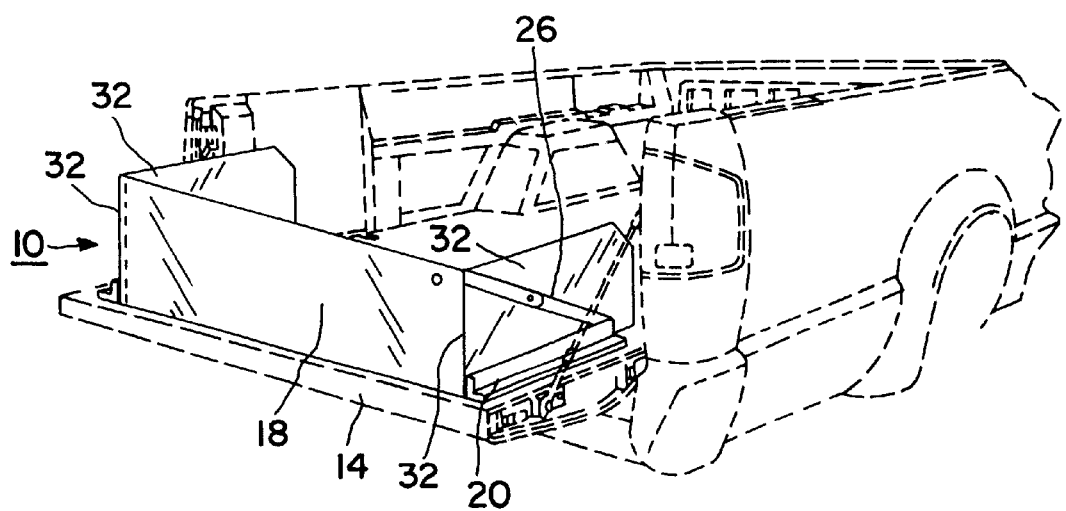
FIG. 4 shows shows a truckbed of the prior art with the tailgate down and the door of this invention vertical.

FIG. 3 shows the rear door 10 of this invention folded against the tail gate 14. FIG. 4 shows the rear door 10 vertical and oriented perpendicular to the open tail gate 14. In FIGS. 3 and 4, the truck body is shown in phantom to more clearly distinguish the door 10.

Figure 5:
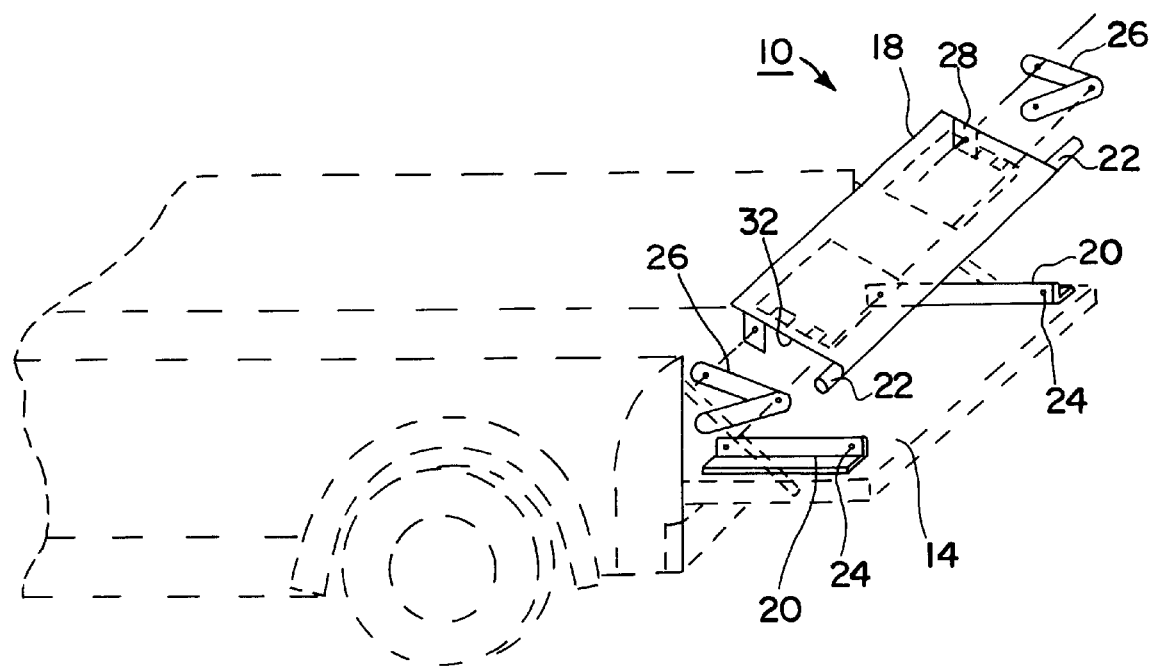
FIG. 5 is an exploded view of the invention.

FIG. 5 is an exploded view of the door 10 poised above the tailgate 14 (in phantom) including the door panel 18, and a pair of elongated members which are shown as angles 20. Each angle 20 is bolted along an edge of the tailgate 14 opposite the other angle 20. The door panel 18 is hingably attached to each angle 20 by a shaft 22 that is inserted in a hole 24 in the respective angle 20.

Figure 6:
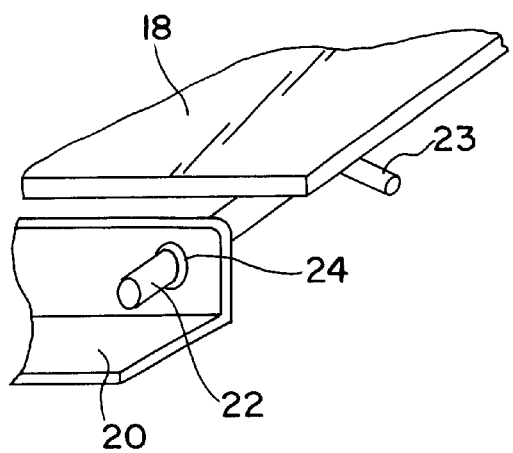
FIG. 6 shows details of the door hinge.
Figure 8:
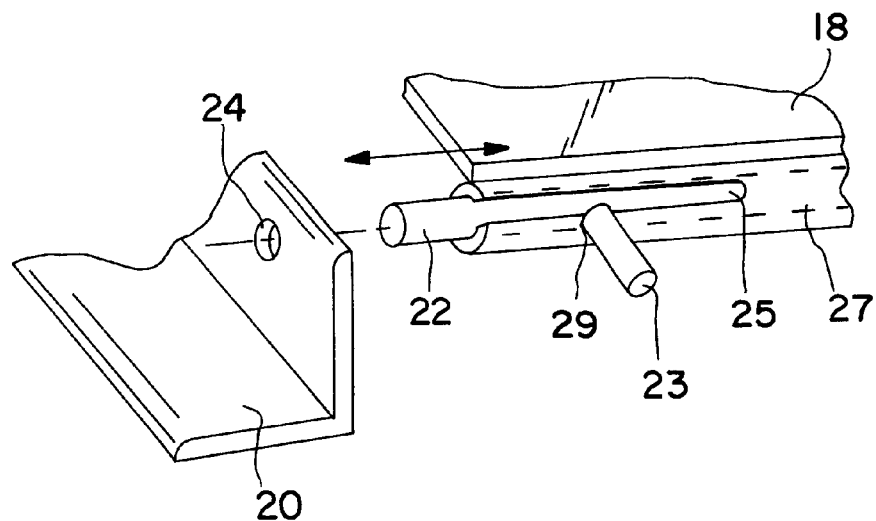
FIG. 8 shows details of the detachable hinging attachment.

FIGS. 6 and 8 show more clearly the hingable attachment of door panel 18 to angle 20 by shaft 22 through hole 24. FIG. 8 shows the door hinge including a sleeve 27 secured (welding is preferred) along the edge of door 18. Shaft 22 sliding into sleeve 27. An end of stud 23 is secured to shaft 22 and moves in groove 25. In order to install the door panel 18, the shaft 22 on each end of the door panel 18 is retracted in sleeve 27 allowing positioning of the door 18 between the angles 20. Then the shaft 22 is slid through hole 24 and the angle 20 and rotated thereby engaging notch 29 and locking the shaft 22 in position. According to this arrangement, the door panel 18 can be removed from the truck or mounted as required.

Figure 7:
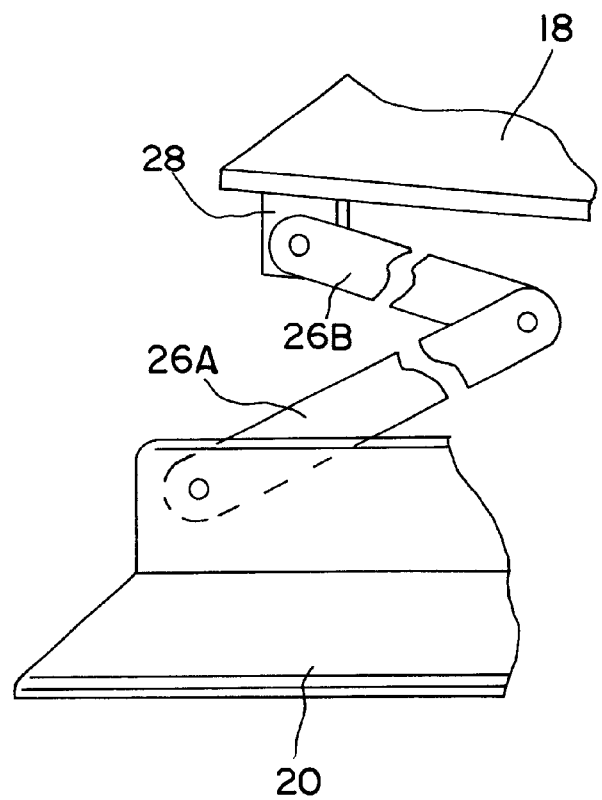
FIG. 7 shows details of the brace being foldable arms for retaining the door in its vertical orientation.

The door panel 18 is secured in its upright orientation by a pair of brace members 26. One brace member on one end of the door panel 18 and the other brace member 26 being on the opposite end of the door panel 18. In one embodiment and as shown to greater advantage in FIG. 7, each brace member 26 has two arms 26A, B hingably attached to one another end to end. The free end of each one arm 26A is hingably attached to an end of respective angle 20 and the free end of each another arm 26B is hingably attached by bracket 28 to an edge of rear door panel 18 so that the rear door panel 18 is maintained in its upright orientation when the tail gate 14 is down and the door panel 18 is up as shown in FIG. 4.

In an additional embodiment and as shown in FIGS. 3 and 4, a pair of smaller side doors 30 are provided which are hingably attached to rear door panel 18 along outer edges 32 so that, when the tailgate 14, is down, rear door panel 18 is vertical, and side doors 30 are swung against folding braces 26, the bed of the truck is completely enclosed and an extension of about 30 inches has been added to the truck bed. This is a very convenient length for carrying, e.g., a stack of wall panels.

When the additional length of the truck bed is not required, the tailgate is up 14, the rear door 18 is folded against the tail gate 14, and the side doors.

There has been described a door hingably attached to the tailgate of of a pickup truck that virtually converts a six foot bed to an eight foot bed. When not required the door folds out of the way against the tailgate.

In one embodiment, side doors are hingably attached to side edges of the door so that the bed is completely surrounded by a wall.

The door can be removed from the truck for temporary storage when required.

Variations and modifications of this invention may be contemplated after reading the specifications and studying the drawings which are within the scope of the invention.

As another embodiment, a pair of short angle brackets may be used in place of each elongated angle, one member of each pair of brackets having an aperture for engaging the the end of shaft 22 and the other bracket of each pair having an aperture for engaging the end of the brace 26.

Figure 9:
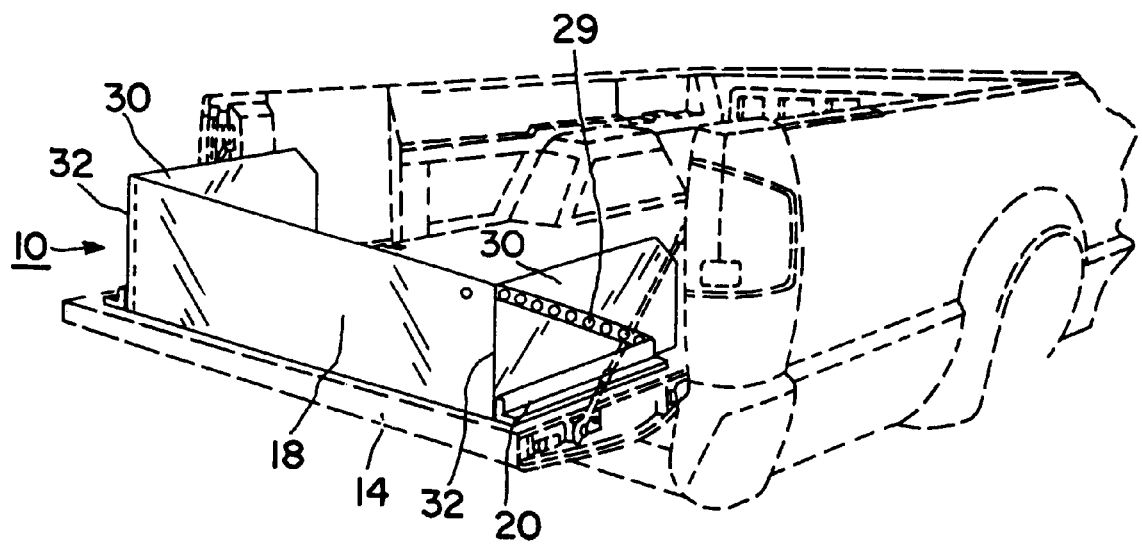
FIG. 9 shows the brace being a pair of chains for retaining the door in its vertical orientation.

As shown in FIG. 9, a chain 29 may be used in place of the foldable arms 26A,B.

Figure 10:
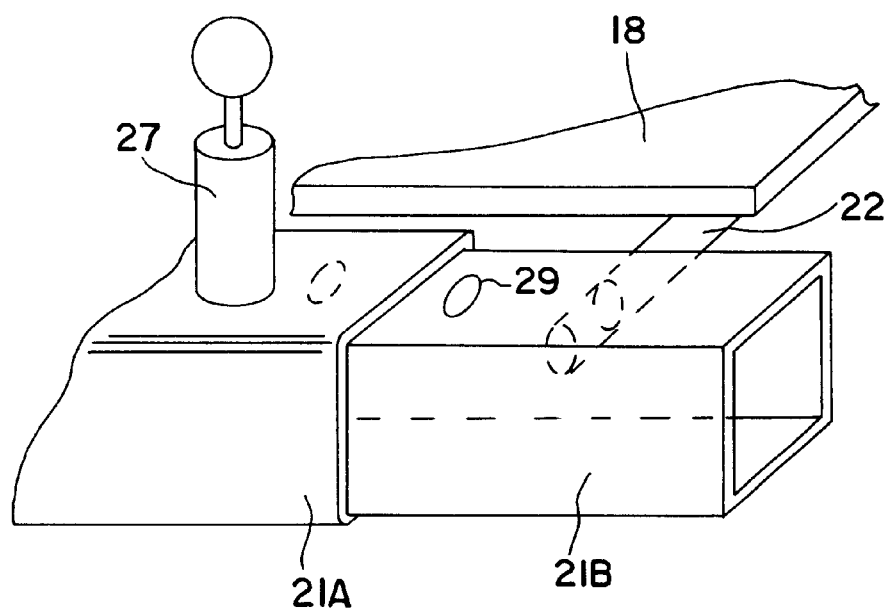
FIG. 10 shows the elongated member being a pair of telescoping square tubes.

FIG. 10 shows an embodiment in which the elongated members to which the door is hingably attached, are a pair of telsescoping square 21A and 21B, each end of the door 18 having one of the pair of telescoping square tubes sectured thereto. The door 18 is hingably attached to the smaller tube 21B which telescopes into the larger tube 21A where it is detachabley secured by a spring loaded poppet pin mounted on outer rube 21A and engages a selected aperture 29 in the smaller tube. This feature permits extending the door at a selectable distance away from the cab in order to provide more space in the truck bed. In this embodiment, a chain 39 shown in FIG. 8 is useed to secure the door in its upright position.

In view of these and other such modifications, I therefore wish to define the scope of my invention by the appended claims.

I claim:

1. A door (10) for the bed of a pickup truck, said bed including a tailgate and a pair of sidewalls, said door enclosing said bed when the tailgate (14) is horizontal, said door comprising:

a door panel (18) having a length that permits positioning said door panel inside said bed with one side edge of said door panel proximal to one sidewall and an opposite side edge of said door panel proximal to an opposite sidewall of said bed;

said door panel having a joining edge having one end joined to said one side edge and another end joined to said another side edge; parallel to a top edge of said tailgate;

a pair of elongated members, one elongated member secured along one edge of said tailgate proximal to one sidewall and another elongated member secured to said tailgate along another edge of said tailgate proximal to said other sidewall and each one of said pair of elongated members being perpendicular to said joining edge of said door panel;

each said elongated member having an aperture;

a pair of shaft means mounted along said joining edge of said panel and arranged in operable combination with said aperture of each said elongated member for rotating said panel about said joining edge, means for restricting rotation of said door panel between a position where said door panel is folded against said tailgate and a position wherein said door panel is vertical when said tailgate is horizontal.

2. The door of claim 1 wherein said elongated member is one of:

(i) an elongated angle;

(ii) an elongated square tube.

3. The door of claim 1 wherein said means for restricting rotation comprises:

a pair of braces (26) on opposites sides of the door (18);

each brace (26) having two arms (26A, B), said two arms hingably attached to one another end to end;

each brace having one end hingably attached to an end of one said elongated member distal from said aperture respectively;

each brace having another end hingably attached to an edge of said rear door panel (18) proximal to said joining edge providing that the rear door panel (18) is supported when the tail gate (14) is down and the door panel (18) is vertical.

4. The door of claim 1 wherein said means for restricting rotation comprises:

a pair of chains;

each chain having one end attached to an end of one said elongated member respectively and distal from said joining edge;

each said chain having another end attached to an edge of said rear door (18) distal from said joining edge providing that the rear door (18) is supported in its upright orientation when the tail gate (14) is down and the door panel (18) is vertical.

5. The door of claim 1 which further comprises:

a pair of side panels (32) one side panel for each side of said bed;

each side panel hingably joined at a side edge of said door panel and arranged when in one position to be folded against said door panel between said door panel and said tailgate when said door panel is folded against said tailgate and oriented perpendicular to said door panel when said tailgate is horizontal and said door panel is vertical.

6. A door (10) for the bed of a pickup truck, said bed including a tailgate and a pair of sidewalls, said door enclosing said bed when the tailgate (14) is horizontal, said door comprising:

a door panel (18) having a length that permits positioning said door panel inside said bed with one side edge of said door panel proximal to one sidewall (27) and an opposite side edge of said door panel proximal to an opposite sidewall of said bed;

said door panel having a joining edge having one end joined to said one side edge and and another end joined to said another side edge; parallel to a top edge of said tailgate;

a pair of elongated members, one elongated member secured along one edge of said tailgate proximal to one sidewall and another elongated member secured to said tailgate along another edge of said tailgate proximal to said other sidewall and each elongated member being perpendicular to said joining edge of said door panel;

each said elongated member is one of:
(i) an elongated angle;
(ii) an elongated square tube;

each said elongated member having an aperture;

a pair of shaft means mounted along said joining edge of said panel and arranged in operable combination with said aperture of each said elongated member for rotating said panel about said joining edge;

means for restricting rotation of said door panel between a position where said door panel is folded against said tailgate and a position wherein said door panel is vertical when said tailgate is horizontal;

said means for restricting rotation being one of:
(i) a pair of chains, each chain having one end attached to an end of one said elongated member respectively and distal from said joining edge and each said chain having another end attached to an edge of said rear door (18) distal from said joining edge providing that the rear door (18) is supported in its upright orientation when the tail gate (14) is down and the door panel (18) is vertical;

(ii) a pair of braces (26) on opposites sides of the door (18) each brace (26) having two arms (26A, B), said two arms hingably attached to one another end to end, and each brace having one end hingably attached to an end of one said elongated member distal from said aperture respectively and each brace having another end hingably attached to an edge of said rear door panel (18) proximal to said joining edge providing that the rear door panel (18) is supported when the tail gate (14) is down and the door panel (18) is vertical;

a pair of side panels (32) one side panel for each side of said bed;

each side panel hingably joined at a side edge of said door panel and arranged when in one position to be folded against said door panel between said door panel and said tailgate when said door panel is folded against said tailgate and oriented perpendicular to said door panel when said tailgate is horizontal and said door panel is vertical.

* * * * *